(12) United States Patent
Zhu et al.

(10) Patent No.: US 8,916,655 B2
(45) Date of Patent: Dec. 23, 2014

(54) PHOSPHAZENE BLOCKED IMIDAZOLE AS LATENT CATALYST FOR EPOXY RESINS

(75) Inventors: Journey Lu Zhu, Shanghai (CN); Ping Shao Ren, Shanghai (CN); Shaoguang Feng, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 256 days.

(21) Appl. No.: 13/640,645

(22) PCT Filed: Apr. 30, 2010

(86) PCT No.: PCT/CN2010/072371
§ 371 (c)(1),
(2), (4) Date: Oct. 11, 2012

(87) PCT Pub. No.: WO2011/134168
PCT Pub. Date: Nov. 3, 2011

(65) Prior Publication Data
US 2013/0035456 A1 Feb. 7, 2013

(51) Int. Cl.
| | | |
|---|---|---|
| *C08G 59/14* | (2006.01) | |
| *C08L 63/00* | (2006.01) | |
| *C08G 65/48* | (2006.01) | |
| *C08J 5/24* | (2006.01) | |
| *C08G 59/40* | (2006.01) | |
| *C08G 59/68* | (2006.01) | |
| *C08K 5/5399* | (2006.01) | |

(52) U.S. Cl.
CPC ............. *C08J 5/24* (2013.01); *C08G 59/4021* (2013.01); *C08G 59/688* (2013.01); *C08L 63/00* (2013.01); *C08J 2363/02* (2013.01); *C08K 5/5399* (2013.01)
USPC .......................................... 525/523; 525/534

(58) Field of Classification Search
USPC ........................................................ 525/523
See application file for complete search history.

(56) References Cited

U.S. PATENT DOCUMENTS

| | | | |
|---|---|---|---|
| 4,614,788 A | 9/1986 | Dettloff et al. | |
| 5,137,990 A | 8/1992 | Corley | |
| 5,208,318 A | 5/1993 | Keller | |
| 6,451,898 B1 | 9/2002 | Tanimoto et al. | |
| 6,830,825 B2 | 12/2004 | Sumiyoshi et al. | |
| 7,345,102 B2 | 3/2008 | Ito et al. | |
| 2002/0082322 A1 | 6/2002 | Hwang et al. | |
| 2002/0082379 A1* | 6/2002 | Schile | 528/94 |
| 2003/0148107 A1 | 8/2003 | Suzuki et al. | |
| 2008/0234409 A1 | 9/2008 | Akagi et al. | |
| 2010/0068958 A1 | 3/2010 | Carson et al. | |

FOREIGN PATENT DOCUMENTS

| | | |
|---|---|---|
| CN | 101597308 A | 12/2009 |
| JP | 2002-265572 | 9/2002 |
| JP | 2002-265614 | 9/2002 |
| JP | 2003-082317 | 3/2003 |
| JP | 2004-018718 | 1/2004 |
| JP | 2004-018720 | 1/2004 |

OTHER PUBLICATIONS

Ritchie et al., Inorg. Chem., 1980, 19, 3842-3845.

* cited by examiner

*Primary Examiner* — Peter F Godenschwager
*Assistant Examiner* — David Karst
(74) *Attorney, Agent, or Firm* — Whyte Hirschboeck Dudek S.C.

(57) ABSTRACT

Epoxy resin compositions utilizing phosphazene blocked azole compounds as curing catalyst are provided. Also provided are epoxy resins cured with phosphazene blocked azole compounds and methods of making cured epoxy resins using curing catalysts of phosphazene blocked azole compounds.

10 Claims, No Drawings

PHOSPHAZENE BLOCKED IMIDAZOLE AS LATENT CATALYST FOR EPOXY RESINS

CROSS REFERENCE TO RELATED APPLICATION

The present application is the national phase of PCT Patent Application No. PCT/CN2010/072371 filed Apr. 30, 2010. The entire content of which is incorporated by reference herein.

BACKGROUND

Epoxy resins are widely used in coatings, adhesives, printed circuit boards, semiconductor encapsulants, and aerospace composites due to their excellent mechanical strength; chemical, moisture, and corrosion resistance; and good thermal, adhesive, and electrical properties. Imidazoles, particularly alkylated imidazoles, are epoxy curing catalysts known to provide high thermal stability epoxies with excellent properties. However, epoxy resin formulations that utilize conventional alkylated imidazoles have short pot lives and do not provide sufficient latency for many applications, such as adhesive and electrical encapsulation applications. In addition, conventional imidazole or alkylated imidazole curing catalysts typically only provide a standard glass transition temperature lower than 150° C. when used to cure conventional bisphenol A epoxy resins. This is insufficient for applications where a high glass transition temperature is desirable, including electrical device applications, such as electrical laminates, flip chip packaging and electrical encapsulation.

SUMMARY

The present disclosure is directed to phosphazene blocked azole compounds and application thereof in epoxy resins, methods of producing same, and articles containing same.

The present disclosure provides a composition. In an embodiment, a composition is provided and includes a curing catalyst, an epoxy resin, and an epoxy hardener. The curing catalyst includes a phosphazene blocked azole compound (PBAC). In a further embodiment, the PBAC is hexa(imidazolyl)cyclotriphosphazene.

The present disclosure provides another composition. In an embodiment a composition is provided and includes an epoxy resin cured with a curing catalyst comprising a phosphazene blocked azole compound, and optionally an epoxy hardener. In other words, the composition is the reaction product of an epoxy resin, a PBAC, and optionally an epoxy hardener. In a further embodiment, the PBAC is hexa(imidazolyl)cyclotriphosphazene.

The present disclosure provides a method. In an embodiment, a method for making a cured epoxy resin is provided and includes mixing a curing catalyst comprising a phosphazene blocked azole compound with an epoxy resin and optionally an epoxy hardener. The method also includes exposing the mixture to a temperature above the curing onset temperature, whereby the epoxy hardener reacts with the epoxy resin in the presence of the curing catalyst to provide a cured epoxy resin.

The present disclosure provides an article. In an embodiment, an article is provided and includes an epoxy resin and a phosphazene blocked azole compound and/or the reaction product of an epoxy resin, a phosphazene blocked azole compound, and optionally an epoxy hardener. The article may be a pre-preg, a laminate, an electrical laminate, and combinations thereof.

The epoxy compositions of the present disclosure exhibit improved latency, and/or higher glass transition temperature, and/or a faster cure rate compared than conventional epoxy resins and epoxy resins cured with imidazole-based curing catalysts in particular.

DETAILED DESCRIPTION

The present disclosure relates to the use of phosphazene blocked azole compounds (PBAC) as curing catalysts for epoxy resins. In an embodiment, a composition is provided. The composition includes a curing catalyst, an epoxy resin, and an epoxy hardener. The curing catalyst includes a phosphazene blocked azole compound.

Curing Catalysts

The curing catalyst of the present composition includes a phosphazene blocked azole compound. The azole moiety of the PBAC, can be substituted or unsubstituted, and facilitates the formation of an infusible reaction product between the epoxy hardener and the epoxy resin in a final article of manufacture, such as a structural composite or laminate. By an infusible reaction product, it is meant that the epoxy resin has essentially completely cured, which can be considered to be the point during the curing process beyond which there is no change between two consecutive $T_g$ measurements ($\Delta T_g$).

The term "phosphazene," as used herein, is a chain molecule, a ring molecule or a bridged molecule that contains alternating phosphorus and nitrogen atoms with two substituents on each phosphorus atom and represented by the structure (I) below.

(I)

The substituent (—R) may be the same or different and may be a hydrocarbyl group, a substituted hydrocarbyl group, a heteroatom, and combinations thereof. The term n' has a value of 2 to 15,000.

A cyclic phosphazene is represented by the structure (II) below.

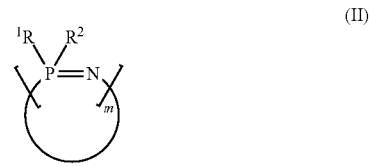

(II)

$^1R$ and $^2R$ of structure (II) may be the same or different and may be any substituent represented by R for structure (I). The term m is a value from 3 to about 15. A nonlimiting example of a suitable cyclic phosphazene is cyclotriphosphazene represented by structure (III) below.

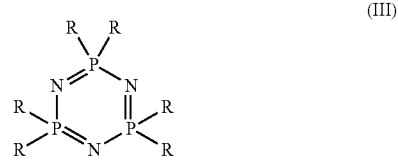

(III)

The —R substituent of structure (III) may be any R substituent as in structure (I) above.

A bridged phosphazene has the structure (IV) below.

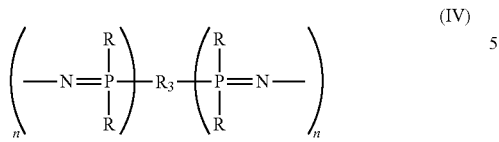
(IV)

$R_3$ is a bi-functional amine or a diol. The —R substituents of structure (IV) may be the same or different and may be any R substituent as in structure (I). The term n' has a value of 2 to 15,000.

Any of the foregoing phosphazene compounds of structure (I)-(IV) may be a phosphazene blocked azole compound (PBAC). An "azole," "azole compound," or "azole group" as used herein, is a five-membered heterocyclic ring structure containing at least one carbon atom and at least one nitrogen atom. The azole may or may not be aromatic and may or may not be substituted. The azole may include more than one heteroatom and/or more than one nitrogen atom. Nonlimiting examples of suitable azole compounds include imidazole, pyrazole, and triazole, any of which may or may not be substituted.

A "phosphazene blocked azole compound" is a phosphazene compound wherein each substituent is an azole group. Nonlimiting examples of a phosphazene blocked azole compound include the phosphazene of structure (I), (II), (III) and/or (IV) wherein each —R substituent is an azole group.

A cyclophosphazene blocked azole compound can be obtained through the reaction between cyclochlorophosphazene and substituted/unsubstituted imidazoles, triazoles or pyrazoles with tertiary amine as acid scavenger. Linear phosphazene blocked azole compound can be obtained through the reaction between linear chlorophosphazene and substituted/unsubstituted imidazoles, triazoles or pyrazoles with tertiary amine as acid scavenger. Such reactions are described in Carriedo, Gabino A, "Phosphazenes" Organophosphorus Chemistry (2009), 38 332-386.

A bridged cyclotriphosphazene blocked azole compound can be obtained through two step reactions: firstly, cyclochlorotriphosphazene reacts with diamine or diol to prepare bridged cyclochlorophosphazene; then the bridged cyclochlorophosphazene can react with substituted/unsubstituted imidazoles, triazoles or pyrazoles to prepare bridged cyclotriphosphazene-blocked substituted imidazoles, triazoles or pyrazoles. Such reactions are described in Brandt, Krystyna, "Synthesis and properties of the new reactive oligomers containing cyclophosphazene moieties", Chemia Stosowana (1986), 30(2), 255-71.

In an embodiment, the phosphazene blocked azole compound is represented by structure (V-1) and/or the structure (V-2) below.

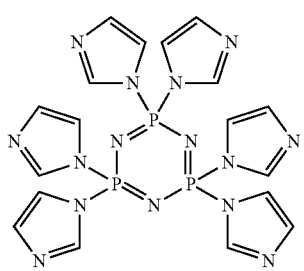
(V-1)

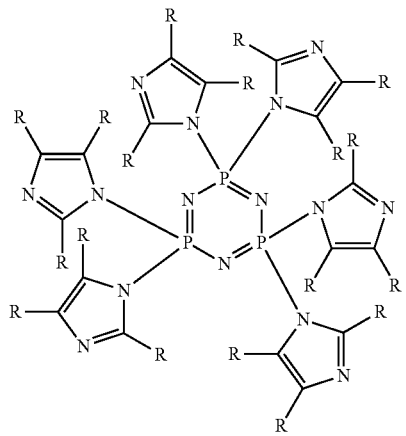
(V-2)

As shown in structure (V-1), each phosphazene substituent is an imidazole group. Structure (V-1) represents hexa(imidazolyl)cyclotriphosphazene. As shown in structure (V-2), each substituent may be a substituted imidazole group wherein the substituent —R of structure (V-2) is the same or different and is selected from hydrogen, a $C_1$-$C_5$ hydrocarbyl group, a $C_3$-$C_5$ hydroxyalkyl group, a $C_3$-$C_4$ alkenyl group, a cyclohexyl group, a $C_6$-$C_{10}$ aryl group, a $C_7$-$C_8$ aralkyl group, a cyclic structure, and combinations thereof.

In an embodiment, the phosphazene blocked azole compound is represented by the structure (VI) below.

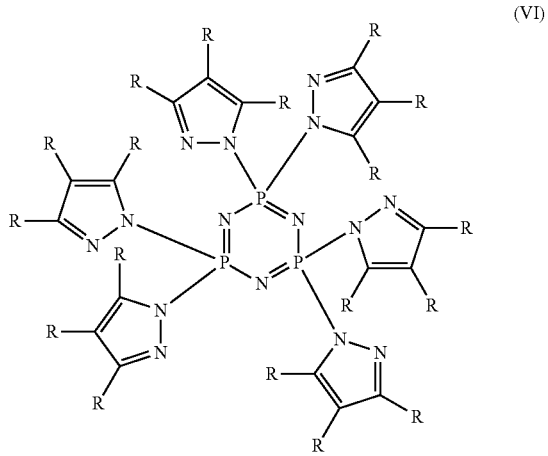
(VI)

As shown in structure (VI), each phosphazene substituent is a substituted pyrazole group. The substituent —R of structure (VI) is the same or different and is selected from hydrogen, a $C_1$-$C_5$ hydrocarbyl group, a $C_3$-$C_5$ hydroxyalkyl group, a $C_3$-$C_4$ alkenyl group, a cyclohexyl group, a $C_6$-$C_{10}$ aryl group, a $C_7$-$C_8$ aralkyl group, a cyclic structure, and combinations thereof.

In an embodiment, the phosphazene blocked azole compound is represented by the structure (VII-1) and/or the structure (VII-2) below.

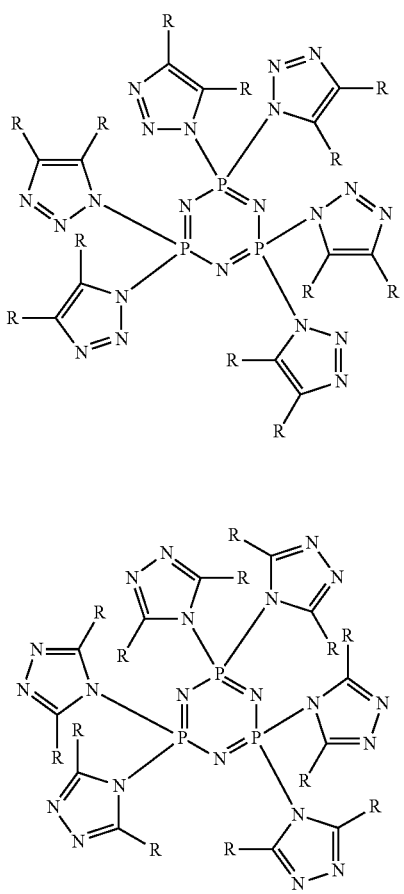

(VII-1)

(VII-2)

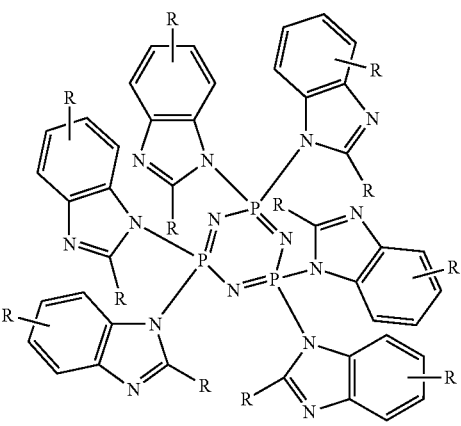

(VIII)

As shown in structure (VII-1) and structure (VII-2), each phosphazene substituent is a substituted triazole group. The substituent —R of structure (VII-1) and/or structure (VII-2) is the same or different and is selected from hydrogen, a $C_1$-$C_5$ hydrocarbyl group, a $C_3$-$C_5$ hydroxyalkyl group, a $C_3$-$C_4$ alkenyl group, a cyclohexyl group, a $C_6$-$C_{10}$ aryl group, a $C_7$-$C_8$ aralkyl group, a cyclic structure, and combinations thereof.

In an embodiment, the phosphazene blocked azole compound is represented by the structure (VIII) below.

The substituent —R of structure (VIII) is the same or different and is selected from hydrogen, a $C_1$-$C_5$ hydrocarbyl group, a $C_3$-$C_5$ hydroxyalkyl group, a $C_3$-$C_4$ alkenyl group, a cyclohexyl group, a $C_6$-$C_{10}$ aryl group, a $C_7$-$C_8$ aralkyl group, a cyclic structure, and combinations thereof.

In an embodiment, the phosphazene blocked azole compound is represented by the structure (IX) below.

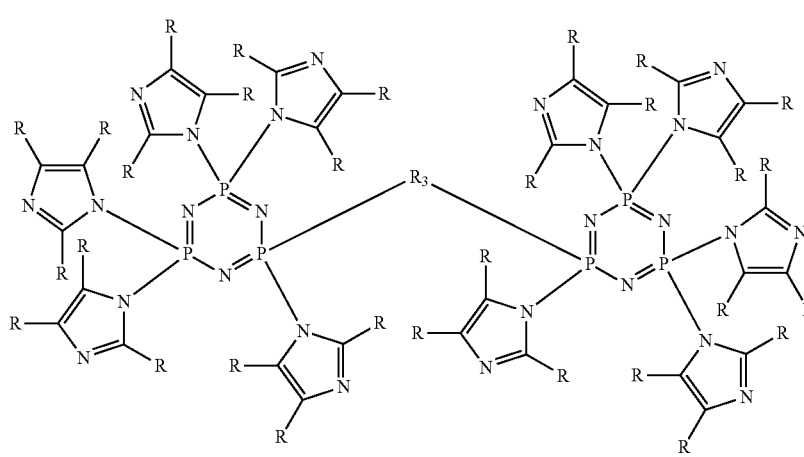

(IX)

Structure (IX) is a bridged cyclophosphazene compound. $R_3$ is a bi-functional amine or a diol. The substituent —R of structure (IX) is the same or different and is selected from hydrogen, a $C_1$-$C_5$ hydrocarbyl group, a $C_3$-$C_5$ hydroxyalkyl group, a $C_3$-$C_4$ alkenyl group, a cyclohexyl group, a $C_6$-$C_{10}$ aryl group, a $C_7$-$C_8$ aralkyl group, a cyclic structure, and combinations thereof.

The curing catalyst in the present composition acts as an effective curing catalyst and provides substantial latency to the composition. In addition the curing catalyst provides for fast cure at temperatures above the cure onset temperature and can effectively increase the glass transition temperature ($T_g$) of the cured epoxy resin compared to conventional curing catalysts. As a result, the present cured epoxy resin is well-suited for use in a variety of applications including electrical laminates, electrical encapsulation and adhesion, and flip-chip packaging.

In an embodiment, the curing catalyst is a cyclophosphazene blocked azole compound. Bound by no particular theory, it is believed that the cyclophosphazene moiety of the PBAC contributes to the latency of the present composition.

The amount of curing catalyst utilized in the present composition is an amount effective to catalyze the reaction of the epoxy resin with the epoxy hardener. The amount of catalyst to be utilized depends upon the components utilized in the composition, the processing requirements, and the performance targets of the articles to be manufactured. In some embodiments, the amount of curing catalyst used is from 0.1 percent to 10 percent by weight, based on total solids content of the composition (i.e., the total weight of the composition). In an embodiment, the composition contains from 1 percent to 5 percent by weight curing catalyst, based on total weight of the composition, or from 1 percent to 4 percent by weight curing catalyst, based on total weight of the composition.

Epoxy Resins

The epoxy resin component of the present composition includes at least one epoxy resin, and in some embodiments includes a blend of two or more epoxy resins. Epoxy resins are those compounds containing at least one vicinal epoxy group. The epoxy resin can be saturated or unsaturated, aliphatic, cycloaliphatic, aromatic or heterocyclic and can be substituted. The epoxy resin can be monomeric or polymeric.

The epoxy resins utilized in the compositions of the present disclosure can be, for example, an epoxy resin or a combination of epoxy resins prepared from an epihalohydrin and a phenol or a phenol type compound; prepared from an epihalohydrin and an amine; prepared from an epihalohydrin and a carboxylic acid; or prepared from the oxidation of unsaturated compounds.

In one embodiment, the epoxy resin includes a resin produced from an epihalohydrin and a phenol or a phenol type compound. The phenol type compounds include compounds having an average of more than one aromatic hydroxyl group per molecule. Nonlimiting examples of phenol type compounds include dihydroxy phenols, biphenols, bisphenols, hydrogenated bisphenols, alkylated biphenols, alkylated bisphenols, trisphenols, phenol-aldehyde resins, novolac resins (that is the reaction product of phenols and simple aldehydes, such as formaldehyde), phenol-aldehyde novolac resins, naphthal novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-alkylated phenol resins, or combinations thereof.

The present curing catalysts are particularly useful for catalyzing the curing of multi-functional (e.g., di-functional) epoxy resins, having an average of two or more epoxy groups per molecule. Nonlimiting examples of multi-functional epoxy resins, include diglycidyl ether of bisphenol A (DGEBA) and cresol-formaldehyde novolac epoxy resins, phenol-formaldehyde novolac epoxy resins, and bisphenol A novolac epoxy resins.

Nonlimiting examples of suitable bisphenol A-based epoxy resins include resins such as D.E.R.™ 300 series and D.E.R.™ 600 series, commercially available from The Dow Chemical Company Midland, Mich. Examples of epoxy novolac resins useful in the present disclosure include resins such as D.E.N.™ 400 series, commercially available from The Dow Chemical Company Midland, Mich.

The preparation of epoxy resins is well known in the art. See, for example, Kirk-Othmer, Encyclopedia of Chemical Technology, 3rd Ed., Vol. 9, pp 267-289. Examples of epoxy resins and their precursors suitable for use in the compositions of this disclosure are also described, for example, in U.S. Pat. Nos. 5,137,990 and 6,451,898.

In an embodiment, the amount of epoxy resin present in the composition is from 10 percent to 99 percent by weight, based on total weight of the composition, or from 50 percent to 95 percent by weigh epoxy resin, based on total weight of the composition or from 80 percent to 95 percent by weight epoxy resin, based on total weight of the composition.

Epoxy Hardeners

The epoxy hardener (also known as a crosslinker or a curing agent), is a compound having at least one group capable of reacting with the epoxy group(s) of the epoxy resin in the present composition. The epoxy hardener may be an amine-based hardener, phenol novolac and anhydride. The term "amine-based hardener," is a compound, either polymeric or monomeric, having at least one amino group or imino group capable of reacting with epoxy groups of the epoxy resin. The phrase "having at least one amino group or imino group" means that the amine-based hardener can have at least one amino group and/or at least one imino group and may have one or more kinds of the group. The amine-based hardener can be, for example, an aliphatic polyamine, an aromatic polyamine or an alicyclic polyamine.

Nonlimiting examples of suitable acyclic aliphatic polyamine-based hardeners include ethylenediamine, diethylenetriamine, triethylenetetramine, tetraethylenepentamine, pentaethylenehexamine, propylenediamine, dipropylenetriamine, hexamethylenediamine, triethylenediamine, 2,5-dimethylhexamethylenediamine, trimethylhexamethylenediamine, and bis(hexamethylene)triamine. Nonlimiting examples of suitable cyclic aliphatic polyamine-based hardeners include 1,2-cyclohexanediamine, 1,3-bis(aminomethyl cyclohexane), isophoronediamine, N-aminoethylpiperazine, bis(4-amino-3-methylcyclohexyl)methane, bis(4-aminocyclohexyl)methane, and 1,3,5-tris(aminomethyl)benzene. Nonlimiting examples of suitable aromatic polyamine-based hardeners include diethyltoluenediamine (DETDA), dimethyltoluenediamine (DMTDA), dimethylthioltoluenediamine (DETTDA), m-phenylenediamine, metaxylenediamine, diaminodiphenylmethane, and diaminodiphenylsulfone. Dicyandiamide (DICY) is another specific example of an amine-based hardener.

The ratio of epoxy hardener to epoxy resin is sufficient to provide a fully cured epoxy resin. The amount of epoxy hardener present can vary depending upon the particular hardeners used (due to the cure chemistry and hardener equivalent weight). The amount of the epoxy hardener present in the compositions can range, for example, from about 0.3 to about 1.5 equivalents per epoxy equivalent of the epoxy resin component. For example, the epoxy hardener can be present in the present compositions in an amount of at least 50 percent, at least 75 percent, at least 85 percent, up to 110 percent, and up to 125 percent, of the stoichiometric amount needed to cure the epoxy resin. By way of illustration, in certain embodiments, the amount of epoxy hardener present in the composition is from 1 to 99 percent by weight epoxy hardener, based on the total weight of the composition, or from 2 to 50 percent by weight epoxy hardener, based on the total weight of the composition, or from 3 to 10 percent by weight epoxy hardener, based on the total weight of the composition.

In an embodiment, the curing catalyst is hexa(imidazolyl)cyclotriphosphazene.

In an embodiment, the epoxy resin of the composition is diglycidyl ether of bisphenol-A.

In an embodiment, the epoxy resin of the composition is a phenol novolac epoxy resin.

In an embodiment, the composition includes an amide-based epoxy hardener.

In an embodiment, the composition includes diglycidyl ether of bisphenol-A, hexa(imidazolyl)cyclotriphosphazene, and an amide-based epoxy hardener.

In an embodiment, the composition includes a phenol novolac epoxy resin, hexa(imidazolyl)cyclotriphosphazene, and an amide-based epoxy hardener.

In an embodiment, the composition has a glass transition temperature of at least 145° C., or at least 145° C. to about 160° C., or greater than 150° C. to 160° C.

In an embodiment, the composition is halogen-free.

The present disclosure provides another composition. In an embodiment, a composition is provided and includes an epoxy resin cured with a curing catalyst comprising a phosphazene blocked azole compound (PBAC). In other words, the composition includes the reaction product of the epoxy resin and the phosphazene blocked azole compound. The composition may also include any epoxy hardener as disclosed above. Thus, the composition may be the reaction product of an epoxy resin, a PBAC, and an epoxy hardener. The epoxy resin may be any epoxy resin disclosed above. The PBAC may be any phosphazene blocked azole compound disclosed above. In an embodiment, the composition includes hexa(imidazolyl)cyclotriphosphazene, or the reaction product of hexa(imidazolyl)cyclotriphosphazene and epoxy resin, and optionally the epoxy hardener.

In an embodiment, the composition has a glass transition temperature of at least 145° C., or at least 145° C. to about 160° C., or greater than 150° C. to 160° C.

In an embodiment, the composition includes the reaction product of diglycidyl ether of bisphenol-A and hexa(imidazolyl)cyclotriphosphazene.

In an embodiment, the composition includes the reaction product of a phenol novolac epoxy resin and hexa(imidazolyl)cyclotriphosphazene.

Any of the foregoing compositions may comprise two or more embodiments disclosed herein.

Optional Components

Any of foregoing compositions may optionally include other additives which are typically used in an epoxy resin composition, particularly for making electrical laminates; and which do not detrimentally affect the properties or performance of the composition, or the final cured product made therefrom. For example, other optional components useful in the compositions include curing inhibitors; fillers, such as silica; wetting agents; colorants, such as carbon black; flame retardants, such as aluminum trihydrate (ATH) and magnesium dihydroxide (MDH); processing aids; fluorescent compounds; such as tetraphenolethane (TPE) or derivatives thereof; UV blocking compounds; surfactants; flow control agents; plasticizers and other additives. The amount of additive present in the compositions will vary depending on the nature of the particular additives used and the desired characteristics of the final cured epoxy resin. Therefore, the additive content can vary over a broad range. For example, in some embodiments, the compositions include from 1 to 99 (or from 2 to 90) percent by weight additives, based on the total weight of the composition.

The compositions can further include thermoplastic tougheners, such as siloxane rubbers, polyurethanes, polyolefins, polyesters, and the like. Typical ranges for the tougheners, if present, are 1 to 90 percent by weight, based on the weight of the composition. This includes compositions that include 2 to 90 percent by weight of thermoplastic toughener, based on the total weight of the composition.

The compositions of the present disclosure can also optionally contain one or more solvents. Non-limiting examples of suitable solvents include ketones, alcohols, water, glycol ethers, aromatic hydrocarbons and mixtures thereof. Preferred solvents include acetone, methyl ethyl ketone, methyl isobutyl ketone, cyclohexanone, methylpyrrolidinone, propylene glycol monomethyl ether, propylene glycol monomethyl ether acetate, ethylene glycol monomethyl ether, methyl amyl ketone, methanol, isopropanol, toluene, xylene, and dimethylformamide (DMF). A single solvent may be used, but also separate solvents may be used for one or more components. When a solvent is used, the amount of solvent present in the composition is typically from 1 percent by weight to 50 percent by weight; or from 10 percent by weight to 45 percent by weight, or from 15 percent by weight to 40 percent by weight, based on the total weight of the composition, depending on the end use application of the epoxy resin composition.

Curing Properties

The curing properties of the present compositions are analyzed using differential scanning calorimetry (DSC). Curing properties that can be used to characterize the compositions include their Tg, cure onset temperature ($T_{onset}$), temperature at the exothermic peak of the curing reaction ($T_{peak}$), total heat of cure ($\Delta H_{cure}$(J/g)), maximum rate of cure and percent cure.

During DSC, heat flow from a sample is measured while the sample is heated. The glass transition event, corresponding to Tg, is observed as an endothermic stepwise increase in the heat flow in a DSC curve. Tg represents the region in which the epoxy resin transforms from a hard, glassy solid to a viscous liquid. With a further increase in the sample temperature, the epoxy resin eventually undergoes curing, which is reflected as a large exothermic peak in the DSC curve. $T_{onset}$ is the temperature at which the heat flow deviates from a linear response and the exothermic peak temperature ($T_{peak}$) reflects the maximum rate of curing of the resin. At the completion of curing, the DSC heat flow returns to a quasi-linear response. The area under the exothermic peak in the DSC curve can be integrated to give the heat of cure, $\Delta H_{cure}$ (J/g). As an epoxy resin cures Tg increases and $\Delta H_{cure}$ decreases.

The changes in Tg and the heat of cure can be used to characterize and quantify the degree of cure of the present compositions. As the epoxy resin approaches complete cure, the Tg will achieve a maximum value, $Tg(\infty)$. As the resin becomes more crosslinked, the heat of curing becomes increasingly smaller. The heat of cure can be used to determine the percent cure of the epoxy resin using the following simple calculation: (% cure)=$(\Delta H_{uncured} - \Delta H_{cured})/$ ($\Delta H_{uncured}$), where $\Delta H_{uncured}$ is the heat of cure of the uncured resin and $\Delta H_{cured}$ is the heat of cure of the partially, or fully, cured resin.

The latency of the present compositions is reflected in their high $T_{onset}$ and $T_{peak}$ temperatures, while the fast curing properties of the compositions at temperatures above $T_{onset}$ is reflected in their high $\Delta H_{cure}$ values, relative to comparable compositions made with conventional curing catalysts, such as 2-methylimidazole (2-MI) and/or 2-phenylimidazone (2-PI). Thus, as illustrated in the examples, below, some embodiments of the present compositions ("inventive compositions") have a $T_{onset}$ that is at least 10, at least 15, or even at least 20° C. higher than that of an equivalent composition that differs from the inventive composition only in the curing catalyst—namely, the inventive compositions include a PBAC and the conventional comparative samples lack the PBAC and have an-imidazole-based curing catalyst, with all other components and amounts being the same or substantially the same.

In addition, the phosphazene blocked azole compound curing catalysts of the present compositions are able to provide increased Tg relative to an equivalent composition that differs from the inventive composition only in that the comparative samples use an imidazole-based curing catalyst, and lack the PBAC. For example, the Tg can be improved by at least 5° C., at least 10° C., or even at least 15° C. by replacing a conventional epoxy curing catalyst, such as 2-MI or 2-PI with a PBAC curing catalyst. Some embodiments provide a cured epoxy resin having a Tg of at least 130° C. This includes cured epoxy resin having a Tg of at least 140° C. and still further includes cured epoxy resins having a Tg of greater than 150° C., and an upper limit for Tg of about 160° C.

Articles

The present compositions can be used to fabricate articles. Nonlimiting examples of suitable articles include pre-pregs, composites, laminates, and electrical laminates. The articles include the present epoxy resin compositions containing the PBAC and/or the reaction product of the PBAC and the epoxy resin and optionally the epoxy hardener. The term "pre-preg" is a composite of a porous reinforcement impregnated with a curable resin composition, such as the epoxy resin compositions described herein. Impregnation of the porous reinforcement can be carried out by a variety of methods, including, immersing the porous reinforcement in a curable resin composition, spraying the porous reinforcement with a curable resin composition, exposing the porous reinforcement to a stream of a curable resin composition and vacuum infiltrating the porous reinforcement with a curable resin composition. Following impregnation, any excess resin composition on the porous reinforcement is allowed to drain off, or is otherwise removed, to provide the "pre-preg". Examples of porous reinforcements from which pre-pregs can be fabricated include fibrous materials such as fibers, woven cloth, fiber mesh, fiber mats, and unwoven aramid reinforcements such as those sold under the trademark THERMOUNT, available from DuPont, Wilmington, Del. Such materials can be made, for example, from glass, fiberglass, quartz, paper, which may be cellulosic or synthetic, a thermoplastic resin substrate such as aramid reinforcements, polyethylene, poly(p-phenyleneterephthalamide), polyester, polytetrafluoroethylene and poly(p-phenylenebenzobisthiazole), syndiotatic polystyrene, carbon, graphite, ceramic or metal.

The term "laminate" is an article made by pressing together, under elevated temperatures and pressures, the multiple layers of a multi-layered structure that includes at least one layer of pre-preg, such that the layer(s) of pre-preg are completely or essentially completely cured. An "electrical laminate" is a laminate in which one of the layers comprises an electrically conductive material, such as a metal foil. A nonlimiting example of an electrical laminate includes one or more sheets of pre-preg (the pre-preg containing the phosphazene blocked azole compound or reaction product thereof) stacked in alternating layers with one or more sheets of a conductive material, such as copper foil. The laid-up sheets are pressed at high temperature and pressure for a time sufficient to cure the resin and form the electrical laminate.

Nonlimiting embodiments of the present disclosure are provided below.

A composition (E1) is provided comprising a curing catalyst, an epoxy resin, and an epoxy hardener. The curing catalyst comprises a phosphazene blocked azole compound. E2. The composition of E1 wherein the curing catalyst is a cyclic phosphazene block azole compound. E3. The composition of any of E1-E2 wherein the phosphazene blocked azole compound comprises a member selected from the group consisting of a cyclic phosphazene blocked imidazole, a cyclic phosphazene blocked tridazole, and a cyclic phosphazene blocked pyrazole. E4. The composition of any of E1-E3 wherein the curing catalyst comprises hexa(imidazolyl)cyclotriphosphazene. E5. The composition of any of E1-E4 wherein the epoxy resin comprises diglycidyl ether of bisphenol-A. E6. The composition of any of E1-E5 wherein the epoxy resin comprises a phenol novolac epoxy resin. E7. The composition of any of E1-E6 wherein the epoxy hardener comprises an amide-based epoxy hardener. E8. The composition of any of E1-E7 comprising diglycidyl ether of bisphenol-A, hexa(imidazolyl)cyclotriphosphazene, and an amide-based epoxy hardener. E9. The composition of any of E1-E8 comprising a phenol novolac epoxy resin, hexa(imidazolyl)cyclotriphosphazene, and an amide-based epoxy hardener. E10. The composition of any of E1-E9 having a glass transition temperature of at least 145° C.

Another composition (E11) is provided comprising an epoxy resin cured with a curing catalyst comprising a phosphazene blocked azole compound. E12. The composition of E11 comprising hexa(imidazolyl)cyclotriphosphazene and/or the reaction product of hexa(imidazolyl)cyclotriphosphazene and the epoxy resin. E13. The composition of any of E11-E12 having a glass transition temperature of at least 145° C. E14. The composition of any of E11-E13 wherein the epoxy resin is diglycidyl ether of bisphenol-A. E15. The composition of any of E11-E13 wherein the epoxy resin a phenol novolac epoxy resin.

A method (E16) for making a cured epoxy resin is provided and the method comprises mixing a curing catalyst comprising a phosphazene blocked azole compound with an epoxy resin and an epoxy hardener. The method also includes exposing the mixture to a temperature above the curing onset temperature, whereby the epoxy hardener reacts with the epoxy resin in the presence of the curing catalyst to provide a cured epoxy resin. E17. The method of E16 wherein the curing catalyst is selected from the group consisting of a cyclic phosphazene blocked imidazole, a cyclic phosphazene blocked tridazole, and a cyclic phosphazene blocked pyrazole. E18. The method of any of E16-E17 wherein the curing catalyst is hexa(imidazolyl)cyclotriphosphazene.

An article (E19) is provided and comprises an epoxy resin and a phosphazene blocked azole compound and/or the reaction product of an epoxy resin, a phosphazene blocked azole compound, and optionally an epoxy hardener. E20. The article of E19 wherein the phosphazene blocked azole compound is hexa(imidazolyl)cyclotriphosphazene. E21. The article of any of E19-E20 wherein the article is selected from the group consisting of a pre-preg, a laminate, an electrical laminate, and combinations thereof.

DEFINITIONS

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1-20 carbon atoms.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, a heteroatom, and combinations thereof.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1-20 carbon atoms.

The term "blend" as used herein, is a mixture of two or more components. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising" and its derivatives are not intended to exclude the presence of any additional component, step or procedure, whether or not the same is specifically disclosed. In order to avoid any doubt, any process or composition claimed through use of the term "comprising" may include any additional steps, equipment, additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

A "heteroatom" is an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si.

"Heterocyclic" or "heterocyclic structure" is a closed ring cyclic or polycyclic structure wherein the ring members are carbon and at least one heteroatom. A heterocyclic structure may be aromatic or aliphatic.

A "hydrocarbyl," "hydrocarbon," and/or "hydrocarbyl group" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

A "substituted hydrocarbyl," "substituted hydrocarbon," and/or "substituted hydrocarbyl group" refer to a hydrocarbyl group that is substituted with one or more nonhydrocarbyl substituent groups. A nonlimiting example of a nonhydrocarbyl substituent group is a heteroatom.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

Numerical ranges include all values from and including the lower and the upper values, in increments of one unit, provided that there is a separation of at least two units between any lower value and any higher value. As an example, if a compositional, physical or other property, is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of epoxy resin, solvents, curing agents and additives in the composition, and the various characteristics and properties by which these components are defined.

As used with respect to a chemical compound, unless specifically indicated otherwise, the singular includes all isomeric forms and vice versa.

Test Methods

Glass transition temperature (Tg), cure onset temperature ($T_{onset}$), temperature at the exothermic peak of the curing reaction ($T_{peak}$), total heat of cure ($\Delta H_{cure}$(J/g)), maximum rate of cure, and percent cure are determined by way of differential scanning calorimetry (DSC), TA instruments model Q2000.

During DSC, heat flow from a sample is measured while the sample is heated. The glass transition event, corresponding to Tg, is observed as an endothermic stepwise increase in the heat flow in a DSC curve. Tg represents the region in which the epoxy resin transforms from a hard, glassy solid to a viscous liquid. With a further increase in the sample temperature, the epoxy resin eventually undergoes curing, which is reflected as a large exothermic peak in the DSC curve. $T_{onset}$ is the temperature at which the heat flow deviates from a linear response and the exothermic peak temperature ($T_{peak}$) reflects the maximum rate of curing of the resin. At the completion of curing, the DSC heat flow returns to a quasi-linear response. The area under the exothermic peak in the DSC curve can be integrated to give the heat of cure, $\Delta H_{cure}$ (J/g). As an epoxy resin cures Tg increases and $\Delta H_{cure}$ decreases.

By way of example and not by limitation, examples of the present disclosure will now be provided.

EXAMPLES

Preparation of Phosphazene Blocked Imidazole hexa(imidazolyl)cyclotriphosphazene, "LC-1"

The raw materials used in the synthesis of LC-1 are: (1) hexichlorocyclotriphosphazene (HCCP), grade name—PNC, supplier—Xinyi Chemical Co. Ltd.; and (2) imidazole, available from Sinopharm Chemical Reagent Company (SCRC).

LC-1 is synthesized and characterized as follows. Imidazole (2.345 g, 0.0345 mol) is added to 150 mL tetrahydrofuran (THF) and stirred until solvated in a three-necked flask. Under an $N_2$ atmosphere, 1.00 g (2.874 mmol) of the HCCP is solvated in 50 ml THF and added in a dropwise fashion into the solution. The reaction mixture is stirred vigorously for 1 hour, then filtered under nitrogen. The solvent is removed from the filtrate with the use of a Rotovap. The solid residue is washed with 20 mL THF to remove unreacted imidazole, resulting in the production of the product, LC-1, with a yield of 90%.

The reaction mechanism is as follows:

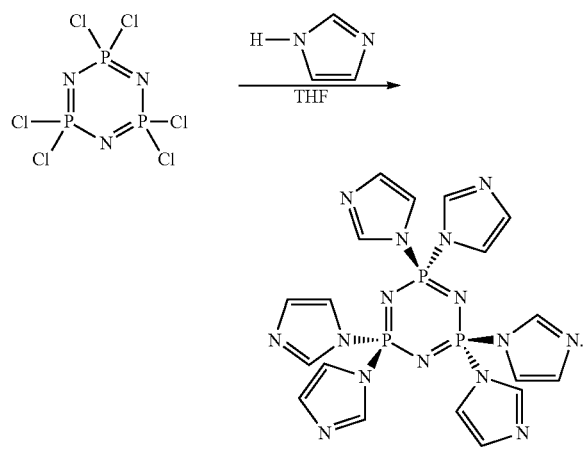

The product is characterized using $^1H$ NMR and $^{31}P$ NMR. The peaks in the NMR for the product are as follows: (1) $^1H$ NMR (CDCl$_3$): δ 7.74 (s, 6H), 7.24 (s, 6H), 7.09 (s, 6H); and $^{31}P$ NMR (CDCl$_3$): δ −1.82 (s, 3P).

Example 1

Epoxy Resins Cured with LC-1 Compared with Epoxy Resins Cured with 2-MI

The raw materials used in the formulations for the inventive and comparative samples in this example are shown in Table 1.

TABLE 1

| Function | Chemical name | Grade Name | Supplier | Weight Ratio |
|---|---|---|---|---|
| Epoxy Resin | DGEBA | D.E.R. ™ 331 | Dow Chemical Company | 94.5% |
| Epoxy Hardener | DICY | Dyhard 100S | Dugussa | 5.32% |
| Comparative Curing Catalyst | 2-MI | | SCRC | 1%, 2% and 3% |
| Inventive Curing Catalyst | LC-1 | | | 1%, 2% and 3% |

* - wt % based on total weight of the composition.

The inventive and comparative samples are prepared and characterized as follows. The ingredients are mixed by a high speed mixer. The $T_{onset}$, $T_{peak}$, ΔH and Tg are obtained by DSC (TA instruments model Q2000) using the following DSC testing parameters and procedure:

1: Equilibrate at 23.00° C.;
2: Ramp at 10.00° C./min to 250.00° C.;
3: Isothermal for 3 min (for LC-1) or 30.00 min (for 2-MI);
4: Mark end of cycle 0;
5: Ramp at 10.00° C./min to 23.00° C.;
6: Mark end of cycle 1;
7: Ramp at 10.00° C./min to 250.00° C.;
8: Mark end of cycle 2;
9: End of procedure.

TABLE 2

$T_{onset}$, $T_{peak}$, ΔH and Tg for the inventive examples (IE) and comparative samples (CS).

| | D.E.R. ™ 331 | DICY | Catalyst | $T_{onset}$/° C. | $T_{peak}$/° C. | ΔH | Tg/° C. |
|---|---|---|---|---|---|---|---|
| IS 1 | 17.8 g | 1 g | LC-1 0.2 g | 113.3 | 139.5 | 367.8 | 148.3 |
| IS 2 | 17.8 g | 1 g | LC-1 0.4 g | 102.5 | 151.8 | 322.4 | 153.4 |
| IS 3 | 17.8 g | 1 g | LC-1 0.6 g | 99.7 | 151.2 | 370.9 | 149.4 |
| CS 1 | 17.8 g | 1 g | — | 191.4 | 198.4 | 277.7 | 141.2 |
| CS 2 | 17.8 g | 1 g | 2-MI 0.2 g | 95.2 | 146.2 | 287.7 | 140.6 |
| CS 3 | 17.8 g | 1 g | 2-MI 0.4 g | 76.5 | 116 | 244.6 | 137 |
| CS 4 | 17.8 g | 1 g | 2-MI 0.6 g | 71 | 103.4 | 213.9 | 135.8 |

The data in Table 2 show that formulations containing LC-1 have a Tg about 10° C. higher than those containing 2-MI. Latency is demonstrated by the higher $T_{onset}$ and higher $T_{peak}$ of the formulations containing LC-1 relative to those containing 2-MI as the curing catalyst. Higher ΔH values demonstrate the fast curing property of the inventive examples.

Next Inventive Example 2 (IE 2) and Comparative Sample 2 (CS 2) are cured at 160° C. in an oven for different periods of time (10 min, 20 min, 30 min, 40 min, 60 min and 90 min). The measured Tg value after each period of cure is presented in Table 3.

TABLE 3

Tg values for IE 2 and CS 2 cured at 160° C. for different periods of time.

| | Inventive Example 2 | | | Comparative Sample 2 | | |
|---|---|---|---|---|---|---|
| Cure time/mins | Tg1/C. | Tg2/C. | Tg3/C. | Tg1/C. | Tg2/C. | Tg3/C. |
| 10 | NA | 159 | 158 | 145 | 136 | 135 |
| 20 | 158 | 158 | 157 | 129 | 129 | 128 |

TABLE 3-continued

Tg values for IE 2 and CS 2 cured at 160° C. for different periods of time.

|  | Inventive Example 2 | | | Comparative Sample 2 | | |
|---|---|---|---|---|---|---|
| Cure time/mins | Tg1/C. | Tg2/C. | Tg3/C. | Tg1/C. | Tg2/C. | Tg3/C. |
| 30 | 152 | 154 | 151 | 122 | 132 | 131 |
| 40 | 159 | 160 | 159 | 122 | 129 | 129 |
| 60 | 144 | 146 | 144 | 125 | 134 | 130 |
| 90 | 130 | 136 | 136 | 116 | 128 | 126 |
|  | NA | | | $T_{onset}$ 147° C., $T_{peak}$ 172° C., offset: 193° C., $\Delta H$ = 11.38 J/g | | |

Tg1, Tg2 and Tg3 refer to the Tg values for the $1^{st}$, $2^{nd}$ and $3^{rd}$ cycles of DSC testing, respectively.

The Tg values in Table 3 show that formulations using LC-1 as a curing catalyst have a higher Tg for the same curing period, relative to the formulations that use 2-MI as the curing catalyst. This demonstrates both the Tg improvement and the faster cure provided by the LC-1 catalyst.

Example 2

Epoxy Resins Cured with LC-1 Compared with Epoxy Resins Cured with 2-PI

The raw materials used in the formulations for the inventive examples and comparative samples in this example are shown in Table 4.

TABLE 4

| Function | Chemical name | Grade Name | Supplier |
|---|---|---|---|
| Epoxy Resin | Phenol Novolac Resin | XZ92530 | Dow Chemical Company |
| Epoxy Hardener | DICY | Dyhard 100S | Dugussa SCRC |
| Comparative Curing Catalyst | 2-PI | | |
| Inventive Curing Catalyst | LC-1 | | |

The inventive examples and comparative samples are prepared and characterized as follows. The ingredients are mixed by a high speed mixer. The formulations for the samples are presented in Table 5. The Tg values for the samples are obtained by DSC (TA instruments model Q2000) using the following DSC testing parameters and procedure:
1: Equilibrate at 40.00° C.;
2: Data storage: On;
3: Ramp at 10.00° C./min to 220.00° C.;
4: Data storage: Off;
5: Equilibrate at 190.00° C.;
6: Isothermal for 15.00 min;
7: Equilibrate at 40.00° C.;
8: Data storage: On;
9: Ramp at 10.00° C./min to 220.00° C.;
10: Mark end of cycle 2;
11: Data storage: Off;
12: Equilibrate at 40.00° C.;
13: Data storage: On;
14: Ramp at 20.00° C./min to 230.00° C.;
15: End of method.

TABLE 5

|  | EW | P % | Resin content % | Solid weight g | Solution weight g | Stoichiometry | mol |
|---|---|---|---|---|---|---|---|
| Comparative Samples | | | | | | | |
| Epoxy XZ 92530 | 325 | 3 | 74.5 | 100 | 134.23 | Epoxy | 0.31 |
| Hardener DICY (in DMF) | 10.4 | | 10 | 2 | 20.00 | Hardener | 0.19 |
| Catalyst 2-PI (in DMF) | 144 | | 10 | 2.3 | 23.00 | E/H | 1.60 |
| Total | | | Varnish gel time: 210 s | 104.3 | | P % | 2.88 |
| Tg2: 123 deg C. | | | | | | | |
| Tg3: 124 deg C. | | | | | | | |
| Inventive Examples | | | | | | | |
| XZ 92530 | 325 | 3 | 74.5 | 100 | 26.85 | Epoxy | 0.31 |
| DICY (in DMF) | 10.4 | | 10 | 2 | 4.00 | Hardener | 0.19 |
| LC-1 (in DMF) | 90 | | 10 | 1.4375 | 2.88 | E/H | 1.60 |
| Total | | | Varnish gel time: 210 s | 103.4375 | | P % | 2.90 |
| Tg2: 130 deg C. | | | | | | | |
| Tg3: 130 deg C. | | | | | | | |

The data in Table 5 show that the Tg value increases by at least 6 or 7° C. for the inventive samples relative to the comparative samples.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
   a curing catalyst comprising a phosphazene blocked azole compound;
   an epoxy resin; and
   an epoxy hardener.

2. The composition of claim 1 wherein the phosphazene blocked azole compound comprises a member selected from the group consisting of a cyclic phosphazene blocked imidazole, a cyclic phosphazene blocked tridazole, and a cyclic phosphazene blocked pyrazole.

3. The composition of claim 1 wherein the curing catalyst comprises hexa(imidazolyl)cyclotriphosphazene.

4. The composition of claim 1 wherein the epoxy resin comprises diglycidyl ether of bisphenol-A.

5. An epoxy resin cured with a curing catalyst comprising a phosphazene blocked azole compound.

6. The epoxy resin of claim 5 having a glass transition temperature of at least 145° C.

7. The epoxy resin of claim 5 wherein the epoxy resin is diglycidyl ether of bisphenol-A.

8. A method for making a cured epoxy resin, the method comprising:
   mixing a curing catalyst comprising a phosphazene-blocked, azole compound with an epoxy resin and a hardener; and
   exposing the mixture to a temperature above the curing onset temperature, whereby the hardener reacts with the epoxy resin in the presence of the curing catalyst to provide a cured epoxy resin.

9. The method of claim 8, wherein the curing catalyst is selected from the group consisting of a cyclic phosphazene blocked imidazole, a cyclic phosphazene blocked tridazole, and a cyclic phosphazene blocked pyrazole.

10. The method of claim 8, in which the curing catalyst is hexa(imidazolyl)cyclotriphosphazene.

* * * * *